United States Patent Office 3,644,559
Patented Feb. 22, 1972

3,644,559
DISPROPORTIONATION USING A CATALYST
CONTAINING THALLIUM
Tadeusz P. Kobylinski, Cheswick, and Harold E. Swift,
Gibsonia, Pa., assignors to Gulf Research & Development Company, Pittsburgh, Pa.
No Drawing. Filed Dec. 8, 1969, Ser. No. 883,277
Int. Cl. C07c 3/62, 11/12, 13/00
U.S. Cl. 260—683 D
13 Claims

ABSTRACT OF THE DISCLOSURE

A process for converting, by disproportionation, an olefin, particularly an alpha-olefin, to a product containing a mixture of olefins of higher and lower carbon number than at least one of the olefins in the olefin charge, which involves contacting the olefin charge with a novel composition containing molybdenum, tungsten or rhenium and thallium on a support, preferably alumina.

---

This invention relates to a process for converting, by disproportionation, an olefin, particularly an alpha-olefin, or a mixture thereof, to a product containing a mixture of olefins of higher and lower carbon number than at least one of the olefins in the olefin charge stock, which involves contacting the olefin charge with a novel composition containing molybdenum, tungsten or rhenium and thallium on an inert support such as alumina.

The "disproportionation" reaction involves a process wherein two molecules of olefin, the same or different, in the presence of a catalyst and under suitable reaction conditions interact in a manner such that an olefin fragment thereof reacts with another olefinic fragment to produce olefins containing combinations of such olefinic fragments. It is believed the carbon atoms of one olefinic double bond form a cyclobutane structure with the carbon atoms of a second olefinic double bond of another molecule and two new olefins are formed by simultaneous rupture of the carbon atoms of the olefinic double bonds. Thus, disproportionation as defined herein can be illustrated by the following reaction:

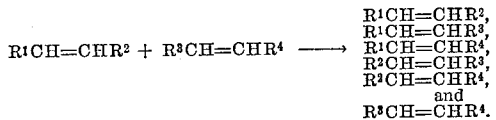

In the equation above, $R^1$, $R^2$, $R^3$ and $R^4$, the same or different, can be an alkyl group or hydrogen. By "olefinic fragment" is means each of the "RCH" portions referred to above.

In prior art disproportionation reactions, a major problem resides in preventing isomerization of the olefinic bond in alpha-olefins to internal positions when the charge stock contains at least four carbon atoms, or preventing polymerization of the olefins, including propylene. Isomerization is undesirable as it gives rise to a wide variety of products rather than simply (1) ethylene and (2) an internal olefin containing two less carbon atoms than a dimer of the olefin charge stock. Polymerization is undesired as it reduces the life of the catalyst by deposition and further reduces selectivity to the desired products. In accordance with the invention, a disproportionation reaction is performed wherein at least a portion of the olefin employed has at least three carbon atoms, and isomerization and polymerization of such olefin is inhibited so that the main reaction products obtained are olefins composed of combinations of alkyl carrying fragments of the olefin charge. In the case of the preferred alpha-olefins, the main products are ethylene and an internal olefin having two less carbon atoms than the total of the carbon atoms in two molecules of the charge alpha-olefin. The inhibition of isomerization and polymerization of the olefin charge stock is achieved by incorporating as part of the disproportionation catalyst a small amount of thallium.

The olefin charge stock employed herein comprises any olefin having from two to 30 carbon atoms per molecule so long as at least a portion of the charge has at least three carbon atoms per molecule. Preferably the charge stock contains from four to 20 carbon atoms per molecule, and most preferably the charge stock contains from four to 12 carbon atoms per molecule. The normal alpha-olefins are the preferred olefinic charge stocks in order to reduce the number of products produced. Ethylene itself cannot be used as a charge stock to the disproportionation reaction since the only product it can produce is itself. A mixture of ethylene and propylene can be employed, however, the primary disproportionation which will occur will involve propylene with propylene to produce butene-2 and ethylene.

Inert diluents can also be present in the olefinic charge stock if desired, and such diluents include, for example, paraffins and naphthenes. The concentration of the olefinic component in the charge stock is not critical and is suitably between five and 100 percent by weight and is preferably from 50 to 100 percent by weight.

Examples of suitable olefins which can be utilized as the charge stock for the subject reaction include propylene; isobutylene; butene-1; butene-2; 3-methylbutene-1; pentene-1; 2-methylbutene-2; pentene-2; hexene-1; hexene-2; hexene-3, 2-methylpentene-3; 2-ethylhexene-2; 5-cyclohexylpentene-1; octene-1; 2,4,4-trimethylpentene-2; nonene-2; decene-1; decene-2; decene-5; 5,6-dimethyloctene-2; undecene-1; dodecene-1; dodecene-2; dodecene-6; 2,2,4,6,6 - pentamethylheptene - 3; tetradecene-1; tetradecene-2; tetradecene-3; tetradecene-7; eicosene-1; tetracosene-1; octacosene-1; etc. or mixtures thereof, and, optionally, included in such mixtures can be ethylene.

The disproportionation reaction is effected by contacting the olefin charge with a novel catalyst under selective reaction conditions. The catalyst is composed of molybdenum, tungsten or rhenium and thallium on a suitable support. The amount of molybdenum or tungsten, calculated as the metal, on the catalyst is suitably from one to 50 percent by weight and is preferably from five to 20 percent by weight based on the total catalyst. The amount of rhenium, calculated as the metal, is suitably from 0.5 to eight percent by weight of the catalyst, is preferably from 0.5 to five percent and is most preferably from one to three percent by weight of the catalyst. The proportion of thallium on the catalyst is suitably from 0.2 to ten percent by weight of the total catalyst, calculated as the metal, is preferably from 0.5 to five percent by weight of the total catalyst, and is most preferably from 0.5 to 3.5 percent by weight of the total catalyst.

Any suitable base known in the disproportionation art can be employed to support the catalyst of this invention. The most suitable base and most widely used is alumina, $Al_2O_3$. Silica-aluminas can also be employed with amounts of silica up to about 30 percent by weight. Known materials can suitably be added to these silica-aluminas to reduce their acidity if desired. Zirconium can also be utilized, as a base, as can aluminum phosphates and thoria.

No matter what base is employed, however, it should possess a high surface area. By a "high surface area" is meant a surface area in excess of about 150 square meters per gram. A suitable range of surface area is from 150 to 600 square meters per gram, but is usually from about 200 to 400 square meters per gram.

The novel catalysts of this invention can be prepared by any desirable procedure so long as the metals in the finally prepared catalyst are in a high valence state. Thus, the various components can be mechanically ground together or the rhenium, for example, can be placed onto an alumina catalyst base by sublimation. After the metals are mixed together or deposited on the base, they are placed into a high valence state by a suitable procedure such as by heating with or without the presence of a gas containing free molecular oxygen. A preferred method of preparation, however, involves impregnating the catalyst base by the incipient wetness technique. Suitable metal salts or salt solutions include, for example, an aqueous solution of ammonium paramolybdate; a hydrocarbon solution of molybdenum hexacarbonyl; rhenium heptoxide; ammonium perrhenate; an aqueous solution of ammonium metatungstate or a hydrocarbon solution of tungsten hexacarbonyl. A sufficient amount of a solution of the desired metal salt is used to introduce the desired amount of rhenium, molybdenum or tungsten, calculated as the metal, on the support. The remaining composition is dried, for example in air at a temperature of about 110° to about 150° C. for about five to about 24 hours and is then calcined in air at a temperature of about 400° to about 600° C. over a period of about one to about 24 hours.

The resulting base is then impregnated, by the incipient wetness technique, with a sufficient amount of a salt of thallium, for example, thallium nitrate, thallium acetate, a thallium chloride, a thallium bromide, or a thallium hydroxide, from an aqueous solution to introduce thereon the desired amount of thallium calculated as metal on the support. Thallium metal may also be dissolved in nitric acid, and this solution used to impregnate the support. The resulting composition is dried, for example, in air at a temperature of about 110° to about 150° C. for about five to about 24 hours and is then calcined in nitrogen or air at a temperature of about 400° to about 600° C. over a period of about one to about 24 hours. The metals in the compositions are believed to be primarily in the oxide form. Although the above procedure involves adding the molybdenum, tungsten or rhenium salts to the catalyst base first, similar results are obtained when the thallium salt is added initially.

The disproportionation reaction conditions can be varied over a wide range. Thus, the olefin charge, in liquid or gaseous form, can be passed over the catalyst at (1) an LHSV (liquid volume of olefin per volume of catalyst per hour) of from about 0.2 to about 60, preferably from 0.5 to about ten, and most preferably from 1.5 to five; or (2) a GHSV (gaseous volume of olefin per volume of catalyst per hour) of from 50 to 1000 or more, and preferably from 400 to 700. The reaction temperature when molybdenum or tungsten is present in the catalyst composition is suitably from about 90° C to about 250° C., preferably about 100° C. to about 150° C.; when rhenium is present the temperature is suitably from 25° C. to about 240° C., preferably about 60° C. to about 150° C. The pressure is not critical and is desirably low, for example, atmospheric pressure. It is preferred, however, that the pressure is sufficient to maintain the feed olefin in the reaction system in the liquid phase in order to obtain increased conversions. Thus, the pressure can be from about 0 pound to about 600 pounds per square inch gauge, and is preferably from about 0 to about 450 pounds per square inch gauge. If the above procedure is operated in batch; the same conditions defined above can be used and contact or reaction time can be from about 10 minutes to about 240 minutes, preferably from about 30 minutes to about 120 minutes.

The reaction is preferably carried out in the absence of solvents, but if solvents are used they should not adversely affect the course of the reaction nor react with the components of the reaction system but should have a boiling point sufficiently different from that of any of the components present in the reaction system. Thus, non-polar solvents, such as hexane, cetane, decane, etc., can be used. The amount of solvent should be that amount sufficient to maintain the contents of the reaction system in the liquid phase. Thus, on a volume basis, one volume of solvent per volume of reaction mixture can be used.

If the olefin is maintained in the liquid phase, the vaporous products, for example, ethylene, are preferably removed from the reaction zone is made. At the end of the reaction period, any vaporous products still present can be flashed off. The individual components of the reaction product can then be recovered by any conventional means, such as fractionation.

It is also important that moisture in the reaction system be kept at a minium. Thus, the catalyst should be flushed with dry nitrogen or other inert gas to remove air and moisture before the reaction begins. The flushing gas can suitably be dried by passage through a synthetic zeolite such as molecular sieves. The feed olefin and other materials added to the reaction system should similarly be dried by passage through a synthetic zeolite such as molecular sieves or otherwise.

The invention will be further described with reference to the following experimental work.

TYPICAL CATALYST PREPARATION PROCEDURES

A sufficient amount of ammonium paramolybdate was dissolved in water and added to a 20–40 mesh alumina having a surface area of 380 square meters per gram by the incipient wetness technique to deposit ten percent by weight molybdenum. The catalyst was dried in an oven at 200° C. for six hours and then calcined at 1000° F. over night.

A sufficient amount of an aqueous solution of thallium nitrate was added to the ten percent molybdenum on alumina catalyst prepared above by the incipient wetness technique to result in the deposition of two percent thallium on the catalyst. The catalyst was dried in a desiccator under vacuum for two hours at 60° C. and for an additional two hours at 110° C. The catalyst was then calcined at 1000° F. for four hours using dry air.

EXAMPLE 1

In the run for this example, 1-butene was passed through a bed of a ten percent molybdenum on alumina catalyst, prepared as described above, at a temperature of 101° C. and a gas hourly space velocity (GHSV) of 600 volumes of 1-butene per volume of catalyst per hour. The conversion of 1-butene was 24.0 weight percent and the product contained 64.7 weight percent ethylene and 3-hexene on a butene-free basis. The results of this run are summarized in Table I below.

A series of runs were made wherein varying amounts of thallium were deposited on the catalyst of Example 1.

EXAMPLE 2

Example 1 was repeated except the catalyst contained, in addition, one percent by weight of thallium deposited by the incipient wetness impregnation technique as described above. The conversion of 1-butene was 18.4 weight percent and the weight percent ethylene and 3-hexene in the butene-free product was 90.2. The results of this run are summarized in Table I below.

EXAMPLE 3

Example 2 was repeated except the catalyst contained two weight percent thallium. The conversion of 1-butene was 11.3 weight percent while the weight percent ethylene and 3-hexene in the butene-free product was 94.0. The results of this run are shown in Table I below.

EXAMPLE 4

Example 3 was repeated except the weight percent thallium was increased to 2.5. The conversion of 1-butene was 7.0 weight percent while the weight percent ethylene and 3-hexene in the butene-free product increased to 97.2. The results of this run are also shown in Table I below.

TABLE I.—DISPROPORTIONATION OF 1-BUTENE

| Example Number | 1 | 2 | 3 | 4 |
|---|---|---|---|---|
| Catalyst, wt. percent: | | | | |
| $Al_2O_3$ | 90 | 89 | 88 | 87.5 |
| Mo | 10 | 10 | 10 | 10 |
| Tl | | 1 | 2 | 2.5 |
| Reaction conditions: | | | | |
| Temperature, °C | 101 | 101 | 101 | 101 |
| GHSV | 600 | 600 | 600 | 600 |
| Results: | | | | |
| Conversion, wt. percent | 24.0 | 18.4 | 11.3 | 7.0 |
| Disproportionation, wt. percent to: | | | | |
| Ethylene and 3-hexene | 64.7 | 90.2 | 94.0 | 97.2 |
| Propylene and pentene | 34.5 | 9.7 | 5.9 | 2.7 |
| Higher olefins | 0.8 | | | |
| Percent 2-butenes in the 1-butene recovered | 9.6 | 2.3 | 1.2 | 0.9 |

In all of the examples above, the reaction pressure was atmospheric and samples were taken after four hours of operation. In each example the catalyst was heated from room temperature in a flow of dry nitrogen to 1000° F. and then heated in dry air at 1000° F. for four hours and then cooled to reaction temperature in dry nitrogen. The analyses were made on the total output of the reactor without prior separation. Conversion was calculated by substracting the amount of butenes recovered from the amount of 1-butene charged. The weight percent of the various disproportionation products is on a butene-free basis and is therefore equivalent to the selectivity of the process for their preparation. A comparison of Examples 1–4 shows that much higher conversions were obtained using the molybdena on alumina catalyst (Example 1) than the thallium containing catalysts (Examples 2–4).

When Examples 2–4 are compared with Example 1, it can be seen that the addition of thallium to the molybdena on alumina catalyst decreases conversion but dramatically increases the selectivity to the desired ethylene and 3-hexene products. Further, the addition of thallium resulted in a substantial decrease in the isomerization activity of the catalyst as noted by the decrease in the percent of 2-butene in the recovered butenes.

Examples 3 was repeated using thallium acetate to deposit the thallium and substantially the same results were obtained. The catalysts of Examples 3 and 4 were duplicated and substantially the same results were obtained. In addition, the catalyst of Example 4 was regenerated by heating in air to 1000° F. for four hours and upon reuse substantially the same results were obtained, showing that repeated air regenerations have no adverse effect on the catalyst.

A series of experiments were performed utilizing 1-octene was the feed. An upflow reactor was used.

EXAMPLE 5

In the run for this example, 1-octene was passed in the liquid phase upflow at a liquid hourly space velocity (volumes of 1-octene per volume of catalyst per hour) of three through a bed of the same catalyst as was used in Example 4 above. The reaction temperature was 93° C. The conversion of 1-octene was 55.8 weight percent and the selectivity to the formation of the desired 7-tetradecene was about 88 percent. The results of this run are shown in Table II below.

EXAMPLE 6

Example 5 was repeated except at a liquid hourly space velocity of four. The conversion of 1-octene decreased to 44.8 weight percent and the selectivity to 7-tetradecene increased to 91.38 percent. The results of this run are shown in Table II below.

TABLE II.—DISPROPORTIONATION OF 1-OCTENE

| Example Number | 5 | 6 | 7 |
|---|---|---|---|
| Catalyst, wt. percent: | | | |
| $Al_2O_3$ | 87.5 | 87.5 | 90.0 |
| Mo | 10.0 | 10.0 | 10.0 |
| Tl | 2.5 | 2.5 | |
| Reaction conditions: | | | |
| Temperature, °C | 93 | 93 | 93 |
| LHSV | 3 | 4 | 3 |
| Results: | | | |
| Conversion, wt. percent | 55.8 | 44.8 | 82.7 |
| Disproportionation, wt. percent to: | | | |
| $C_4$ | 0.08 | | 0.25 |
| $C_5$ | 0.03 | | 0.24 |
| $C_6$ | 0.15 | | 0.57 |
| $C_7$ | 1.52 | 1.27 | 3.91 |
| $C_9$ | 2.03 | 1.64 | 8.32 |
| $C_{10}$ | 0.49 | 0.59 | 2.19 |
| $C_{11}$ | 0.51 | 0.47 | 2.36 |
| $C_{12}$ | 0.51 | 0.41 | 5.60 |
| $C_{13}$ | 4.23 | 3.16 | 18.52 |
| $C_{14}$ | 87.67 | 91.38 | 47.00 |
| $C_{15}$ | 1.68 | 0.75 | 7.05 |
| $C_{16}$ | 0.22 | 0.27 | 2.64 |
| $C_{17}$ | | | 1.31 |
| Unidentified | 0.13 | | |
| Gas products, wt. percent: | | | |
| Ethylene | 94.6 | 96.4 | 75.22 |
| Propylene | 5.3 | 3.5 | 24.77 |

EXAMPLE 7

Example 5 was repeated except the catalyst was the same catalyst as was employed in Example 1. The conversion of 1-octene was 82.7 weight percent and the selectivity to 7-tetradecene was only 47.0 percent.

Referring to Table II, it can be seen that an increased space velocity decreases conversion and increases selectivity. A comparison of the results of Table II with those in Table I shows that much higher conversions are obtained when the olefin is maintained in the preferred liquid phase. A comparison of Examples 5, 6 and 7 shows the addition of thallium results in greatly increased selectivity to 7-tetradecene formation.

In Table II above, the $C_4$ through $C_{17}$ symbols under "Disproportionation, Wt. Percent" refer, of course, to the weight percent of olefinic hydrocarbons having four through 17 carbon atoms respectively.

EXAMPLE 8

In the run for this example, the catalyst was a five weight percent thallium on alumina catalyst which was prepared by the method of incipient wetness using an aqueous solution of thallium nitrate. The alumina was the same as that used in Example 1 above. The reaction conditions were the same as those in Example 6 above. No disproportionation products were recovered.

Resort may be had to such variations and modifications as fall within the spirit of the invention and the scope of the appended claims.

We claim:
1. A process for the disproportionation of at least one monoolefin having from 3 to 30 carbon atoms per molecule or mixtures of at least one of said olefins with ethylene which comprises contacting a charge stock comprising said olefin under disproportionation reaction conditions with a composition comprising molybdenum, rhenium or tungsten and thallium on a support.

2. A process according to claim 1 wherein the amount of molybdenum or tungsten is from 1 to 50 percent by weight of the composition; the amount of rhenium is from 0.5 to 8 percent by weight of the composition; and the amount of thallium is from 0.2 to 10 percent by weight of the composition.

3. A process according to claim 2 wherein the support is alumina.

4. The process of claim 3 wherein the olefin has from 4 to 20 carbon atoms.

5. A process according to claim 3 wherein the olefin is a normal alpha-olefin having from 4 to 12 carbon atoms.

6. A process according to claim 5 wherein the surface area of the alumina is from 150 square meters per gram to 400 square meters per gram.

7. A process according to claim 1 wherein the composition comprises from 1 to 50 weight percent molybdenum and from 0.2 to 10 weight percent thallium.

8. A process according to claim 7 wherein the composition comprises from 5 to 20 weight percent molybdenum and from 0.5 to 5 weight percent thallium.

9. A process according to claim 8 wherein the support is alumina having a surface area from 150 to 400 square meters per gram.

10. A process according to claim 9 wherein the olefin is a normal alpha-olefin having from 4 to 12 carbon atoms per molecule.

11. A process according to claim 10 wherein the contact between olefin and said composition is made at a temperature from 90° to 250° C.

12. A process according to claim 11 wherein the olefin is 1-octene.

13. A process according to claim 11 wherein the olefin is 1-butene.

References Cited

UNITED STATES PATENTS

| | | | |
|---|---|---|---|
| 3,445,541 | 5/1969 | Heckelsberg et al. | 260—680 |
| 3,277,202 | 10/1966 | Benson et al. | 260—666 |
| 3,261,879 | 7/1966 | Banks | 260—683 |
| 3,544,649 | 12/1970 | Dixon et al. | 260—683 |
| 3,463,828 | 8/1969 | Crain | 260—666 |

DELBERT E. GANTZ, Primary Examiner

C. E. SPRESSER, Jr., Assistant Examiner

U.S. Cl. X.R.

260—666A, 680